(12) United States Patent
Killadi et al.

(10) Patent No.: US 10,652,907 B2
(45) Date of Patent: May 12, 2020

(54) PRIORITIZED RADIO ASSIGNMENTS

(71) Applicant: Hewlett Packard Enterprise Development LP, Houston, TX (US)

(72) Inventors: Srinivas Rao Killadi, Bangalore (IN); Sree Vasthav Shatdarshanam Venkata, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/047,406

(22) Filed: Jul. 27, 2018

(65) Prior Publication Data

US 2020/0037335 A1    Jan. 30, 2020

(51) Int. Cl.
*H04W 12/08* (2009.01)
*H04W 72/10* (2009.01)
*H04W 72/04* (2009.01)
*H04W 72/14* (2009.01)
*H04W 84/12* (2009.01)

(52) U.S. Cl.
CPC ....... *H04W 72/10* (2013.01); *H04W 72/0453* (2013.01); *H04W 72/14* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2006/0030329 | A1 | 2/2006 | Faye et al. |
| 2006/0217076 | A1 | 9/2006 | Bishop |
| 2015/0110049 | A1 | 4/2015 | Pabla |
| 2015/0341939 | A1 | 11/2015 | Sharma et al. |
| 2017/0118655 | A1 | 4/2017 | Blosco et al. |
| 2017/0156103 | A1 | 6/2017 | Auvray |
| 2019/0104411 | A1* | 4/2019 | Hotchkiss ............. H04W 12/08 |

OTHER PUBLICATIONS

Hintersteiner, J.D., Deploying a Point-to-(Multi)point Backhaul Network, (Web Page), Retrieved Jul. 27, 2018, 24 Pgs.

* cited by examiner

*Primary Examiner* — Kouroush Mohebbi
(74) *Attorney, Agent, or Firm* — Brooks, Cameron & Huebsch, PLLC

(57) ABSTRACT

An example of a system may include a processing resource and a computing device comprising instructions executable by the processing resource to assign a first radio, operable in a frequency band, of an access point (AP) to a prioritized data zone utilizing the AP; and assign a second radio, operable in the frequency band, of the AP to a plurality of non-prioritized data zones utilizing the AP.

7 Claims, 5 Drawing Sheets

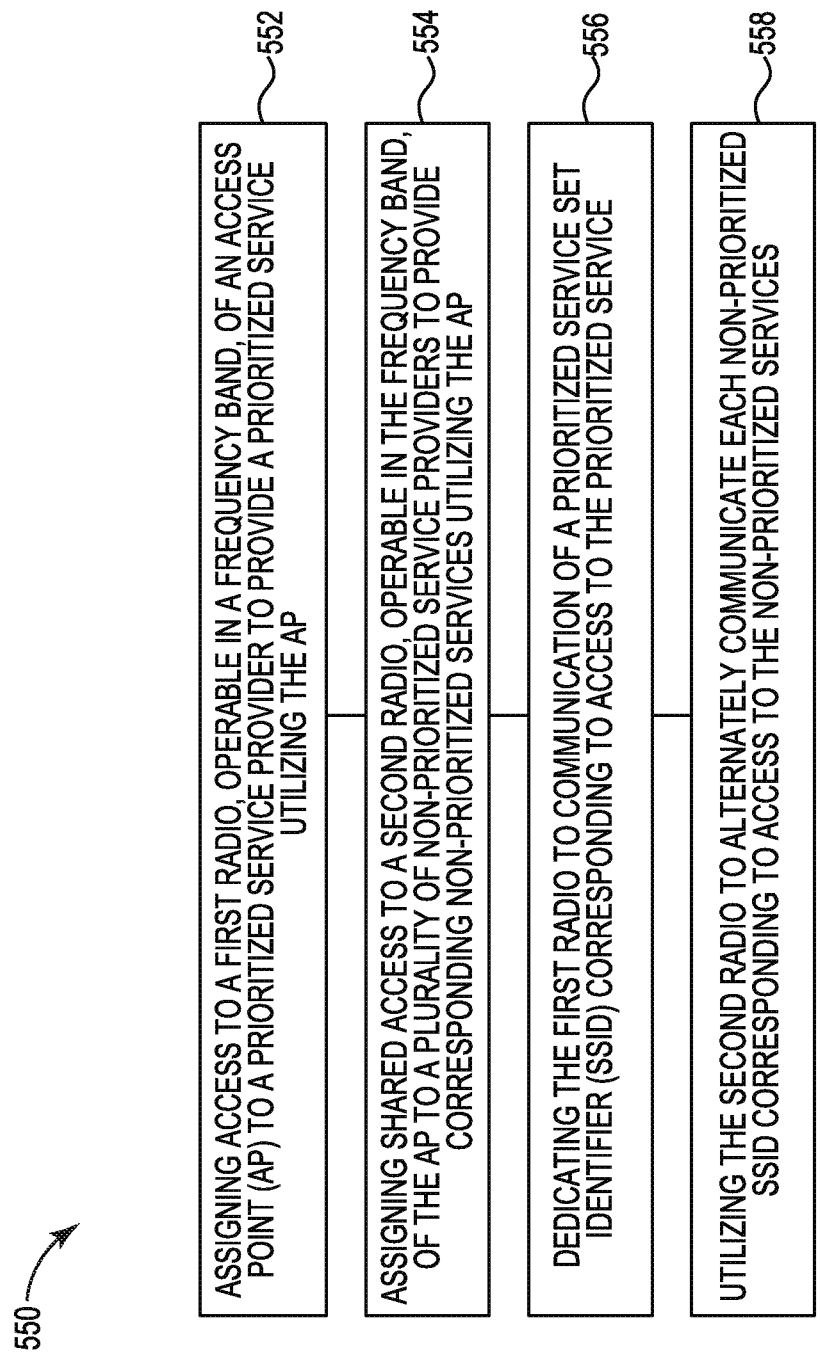

PRIORITIZED RADIO ASSIGNMENTS

BACKGROUND

A computing network may include networking devices to provide for data communication and interaction between computing devices across the computing network. An example of a network device may include an access point (AP). An AP may be a wireless AP including radios to communicate data between a computing network and a client device via radio signals. A computing network to which the wireless AP is providing access may be identified by a service set identifier (SSID).

BRIEF DESCRIPTION OF THE DRAWINGS

FIG. 5 illustrates a diagram of a method for prioritized radio assignments consistent with the disclosure.

DETAILED DESCRIPTION

Figure 1:
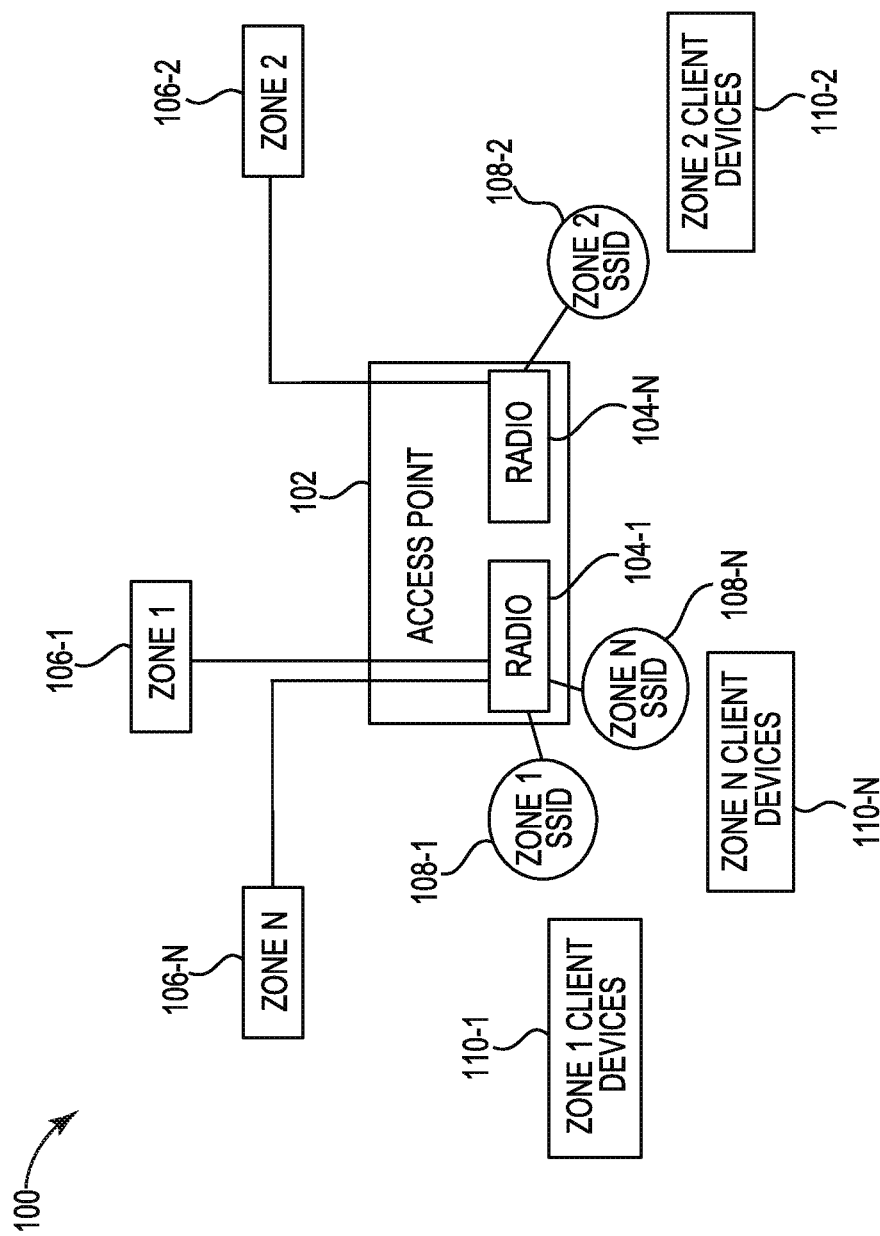
FIG. 1 illustrates an example of an environment for prioritized radio assignments consistent with the disclosure.

As used herein, a network device may include a computing device that is adapted to transmit and/or receive signaling and to process information within such signaling across a network. For example, a network device may include a network controller, an access point, a client device, and/or a data transfer device.

As used herein, a client device may include a computing device including hardware and/or a combination of hardware and instructions executable by the hardware to access and/or communicate with the network and/or other network devices on the network. For example, a client device may include any data processing equipment such as a computer, laptop, cellular phone, smart phone, personal digital assistant, tablet devices, smart devices, wearable smart devices, smart watch, smart glasses, augmented reality devices, virtual reality devices, etc.

As used herein, an Access Point (AP) may include a computing device including hardware and/or a combination of hardware and instructions executable by the hardware to operate as a transmitter and/or a receiver of signals between a client device, other access points, a controller, and/or other network devices on the network. In some examples, an AP may act as a transmitter and/or receiver of wireless radio signals for any known or convenient wireless access technology which may later become known. While the term AP may include network devices that transmit and/or receive IEEE 802.11-based WiFi signals, AP is not intended to be limited to IEEE 802.11-based APs.

APs may generally function as an electronic device that is adapted to allow wireless computing devices, such as client devices, to connect to a wired network via various communications standards. An AP can include a processing resource, memory, and/or input/output interfaces, including wired network interfaces such as IEEE 802.3 Ethernet interfaces, as well as wireless network interfaces such as IEEE 802.11 WiFi interfaces and/or 802.15 interfaces, although examples of the disclosure are not limited to such interfaces. An AP can include a memory resource, including read-write memory, and a hierarchy of persistent memory such as ROM, EPROM, and Flash memory.

APs may include an integrated radio transceiver and/or an integrated radio antenna to communicate data between clients and the computing network utilizing radio signals. For example, an AP may include WiFi radios and/or WiFi antennas to establish WiFi communication links with client devices.

Some examples of WiFi radios may include WiFi radios that are operable in the 2.4 Gigahertz (GHz) Industrial, Scientific and Medical (ISM) frequency band. The 2.4 GHz frequency band may include a cluster of radio frequencies between 2.4 GHz and 2.5 GHz within which the 802.11 WiFi standards such as 802.11b, 802.11g, and/or 80211n operate. The 2.4 GHz frequency band may include fourteen channels, available for use in various global locals, separated by 5 MHz with a bandwidth of 22 MHz. The 2.4 GHz frequency band may include three non-overlapping channels.

Examples of WiFi radios may include WiFi radios that are operable in the 5 GHz ISM frequency band. The 5 GHz frequency band may include a cluster of radio frequencies between 5 GHz and 6 GHz within which the 801.11 WiFi standards such as 802.11a and 802.11n operate. The 5 GHz frequency band may include twenty-three non-overlapping channels, available for use in various global locals, with a bandwidth of 20 MHz per channel.

In some examples, APs may include a plurality of integrated radio transceivers and/or radio antennas. For example, some APs may include both a 2.4 GHz and a 5 GHz radio integrated in the same AP chassis. In further examples, an AP may include two of the same type of radio transceiver and/or radio antenna integrated in the same AP chassis. For example, an AP may be a dual 2.4 GHz and/or a dual 5 GHz radio AP. In an example, a single AP may include two 5 GHz radios and/or antennas.

In an example, an AP including two 5 GHz radios may operate both radios simultaneously. To avoid interference between the two radios on the same chassis, the AP may utilize complementary bandpass filters on the radios. In addition, the AP may operate one of the radios in a first range of the 5 GHz frequency band and operating the other of the radios in a second range of the 5 GHz frequency band that does not overlap with the first range. For example, the AP may segment the 5 GHz frequency band between the two radios. For example, a first one of the radios may be operated in the 5.15 GHz to 5.35 GHz frequency range (e.g., lower band including channel 36 to channel 64) while the second radio may be operated in the 5.47 GHz to 5.850 GHz frequency range (e.g., upper band including channel 100 to channel 165) and complementary bandpass filters may be added on each radio.

The AP may be connected to and/or controller by a network controller. As used herein, a network controller may include a computing device including hardware and/or a combination of hardware and instructions executable by the hardware to manage APs and manage data transfer among the APs in the computing network. A controller may include a wireless local area network (WLAN) controller. The WLAN controller may coordinate the operation of and/or communication between APs in the network to mitigate interference between wireless APs, to perform load balancing, to provide fail over redundancy, to retrieve upgrades, and/or to send updates to the APs, etc. In some examples, the APs may connect, via a wired connection and/or wirelessly, to a controller and the controller may connect to a wireless network. In some examples, the controller may be AP-based controllers that are integrated with the AP.

A network controller may configure the AP to provide client devices access to a segment of the computing network and/or the resources or services of the computing network. The access to the segment of the computing network, the resources of the computing network, and/or the services of the computing network may be identified by a service set identifier (SSID). That is, an SSID may include the primary name associated with an 802.11 wireless local area network (WLAN), or the segment thereof, to which access is being advertised and/or provided by the AP. Client device may utilize the SSID of a specific computing network or computing network segment to identify and/or join the specific computing network or computing network segment by associating with an advertising AP.

An AP may include multi-zone capabilities. An AP with multi-zone capabilities may operate to provide a virtually segmented network running through the same AP. For example, a single AP may be managed by a plurality of network controllers. By dividing control of the AP between different network controllers a single AP may be able to offer a plurality of different computing network connects with different SSIDs corresponding to respective ones of the plurality of controllers. As such, a single AP may offer a plurality of SSIDs corresponding to different controllers, different computing network segments, different security policies, different authentication servers, etc. As such, rather than utilizing costly duplicative physical network devices, multiple networks that are virtually separated may be provided through common physical network devices.

However, the plurality of SSIDs advertised on a multi-zone AP may share the resource of the AP. For example, the SSIDs may equally share with one another and/or compete with one another for access to the radio resource of the AP. As a result, in some prior systems clients utilizing a particular SSID of the plurality of SSIDs may be subject to delayed, interrupted, and/or dropped data communications with the AP when other clients are utilizing the AP to access other SSIDs offered by the AP.

In contrast, examples of the present disclosure may provide prioritized radio assignments for an AP. For example, a particular service provider utilizing the AP to provide access to their SSID may be assigned a priority access to a radio of the AP while other service providers are relegated to sharing access to another radio of the AP. Such prioritization may provide monetization opportunities for network equipment via tiered subscription plans, licensing agreements, and other prioritization schemes. Additionally, such prioritization may provide for resource allocation in line with a network administrator's goals. In an example of the present disclosure, a system may include a processing resource and a computing device comprising instructions executable by the processing resource to assign a first radio, operable in a frequency band, of an access point (AP) to a prioritized data zone utilizing the AP; and assign a second radio, operable in the frequency band, of the AP to a plurality of non-prioritized data zones utilizing the AP. Examples may cause a particular service provider to provide a service over an AP at a higher quality and with better network conditions than other service providers utilizing the same frequency band on the same AP.

FIG. 1 illustrates an example of an environment 100 for prioritized radio assignments consistent with the disclosure. The environment 100 is not limited to a particular example described herein and may include additional components and/or functionalities such as those described with regard to the system 220 of FIG. 2, the computing device 330 of FIG. 3, the non-transitory machine-readable medium 440 of FIG. 4, and the method 550 described in FIG. 5.

The environment 100 may include a network device. The network device may include an access point 102. The access point (AP) 102 may be connected to a computing network and/or a plurality of computing networks. For example, the AP 102 may be connected to a local area network or local area networks providing network coverage in and/or around an environment such as home, an office building, a vehicle, an outdoor space, etc. The AP 102 may be in communication with network controllers and/or other network devices that operate to control the AP 102, configure the AP 102, and/or communicate with the AP 102 in a manner that provides connectivity from a client device to an underlying network via radio communication from the AP 102.

For example, the access point 102 may include a wireless access point. The AP 102 may also be in communication with a wired computing network. The AP 102 may be utilized to establish a wireless local area network access utilizing radio signals to wirelessly communicate data to other APs, to a network controller, to client devices, etc. The AP 102 may utilize a variety of radios to communicate data. For example, the AP may utilize radios such as WiFi transceivers, Bluetooth transceivers, Bluetooth Low Energy (BLE) transceivers, ZigBee transceivers, etc. to wirelessly communicate the data.

In some examples, the AP 102 may include a plurality of radios 104-1 . . . 104-N. The plurality of radios 104-1 . . . 104-N may be a plurality of radios 104-1 . . . 104-N integrated with and/or in communication with a single physical AP 102 chassis.

In examples, the AP 102 may include a first radio 104-1 and a second radio 104-N. The first radio 104-1 may be operable in a particular frequency band. For example, the first radio 104-1 may be a 5 GHz WiFi radio that is operable in the 5 GHz frequency band. The second radio 104-N may also be operable in the particular frequency band. For example, the second radio 104-N may be a 5 GHz WiFi radio that is operable in the 5 GHz frequency band. That is, the first radio 104-1 and the second radio 104-N may be operable within the 5 GHz frequency band.

However, the first radio 104-1 may be operable in first range of radio frequencies within the frequency band and the second radio 104-N may be operable in a second range of frequencies within the same frequency band. The respective ranges may be non-overlapping. For example, the first radio 104-1 may be operated in the 5.15 GHz to 5.35 GHz frequency range (e.g., lower band including channel 36 to channel 64) while the second radio 104-N may be operated in the 5.47 GHz to 5.850 GHz frequency range (e.g., upper band including channel 100 to channel 165), or vice versa, with complementary bandpass filters added on each radio.

The AP 102 may utilize the plurality of radios 104-1 . . . 104-N to communicate data with client devices (e.g., 110-1 . . . 110-N). As such, the AP 102 may provide access to a computing network, computing networks, portion of the computing network, network services, computing resources, network devices, etc. through data communication via the plurality of radios 104-1 . . . 104-N. The AP 102 may advertise the computing network, computing networks, portion of the computing network, network services, computing resources, network devices, etc. to which it is offering access by advertising the service set identifier (SSID) (e.g., 108-1 . . . 108-N) corresponding to and/or identifying the computing network, computing networks, portion of the computing network, network services, computing resources, network devices, etc. utilizing the AP 102.

The AP 102 may be configured to provide multi-zone capabilities. For example, the AP 102 may be configured to terminate in different administrative domains (or zones). That is, the AP 102 may provide access to and/or data communication between a plurality of zones 106-1 . . . 106-N and a plurality of corresponding client devices (e.g., 110-1 . . . 110-N) by terminating its tunnels on controllers residing in the different zones 106-1 . . . 106-N.

A zone 106-1 . . . 106-N may include a controller and/or a cluster of controllers under a single administrative domain. The zone 106-1 . . . 106-N may include a standalone controller, or a cluster of controllers managed by a master controller. Each of the zones 106-1 . . . 106-N utilizing an AP 102 may be either a primary zone or a data zone.

A primary zone may include a zone that the AP 102 connects to when booting up. Multi-zone APs may be fully-managed by the primary zone. The primary zone may include the network devices and/or resources in the physical location where access is being offered by the AP 102. For example, the primary computing network and primary controllers may be located on the premises where the access is being provided by radio communication from the AP. In an example, the AP 102 may be physically located at and providing data communication within an airport facility. The primary computing network may be the computing network and network devices of the airport facility. In such an example, zone 1 106-1 may correspond to the primary computing network (e.g., airport Wifi and/or the primary network controller operated by and/or assigned to the airport IT department).

A data zone may include a secondary zone that the AP 102 connects to after receiving a multi-zone configuration from the primary zone. For example, if there are multi-zone profiles configured and associated in the AP group or AP name profile of the primary zone, then the AP 102 may enter a multi-zone state and start connecting with the specified data zones. The data zone may include network devices and/or resources of a secondary computing network that is segregated and/or physically remote from the primary computing network. For example, each data zone may include a controller and/or a cluster of controllers that is under an administrative domain that is separate from the administrative domain of the primary zone and/or other data zones utilizing the same AP 102. Each data zone utilizing an AP may be associated with a distinct and/or independent entity from the one administering the primary zone.

Each data zone may include a controller that is separate and/or distinct from the primary controller and the controller of other data zones. That is, each data zone of the plurality of zones 106-1 . . . 106-N may correspond to a distinct and/or physically separate controller controlled by a distinct entity. As such, each zone 106-1 . . . 106-N may include a controller that is physically separate and/or remotely located from the controllers of other zones and/or the primary controller and network devices of the primary computing network that the AP 102 is connected to.

For example, the environment 100 may include a public place, such as a shopping center, an airport, a university, etc., may include environments that lease out physical space and/or computing resources to various tenants. The various tenants may wish to establish a data connection with clients 110-1 . . . 110-N in the airport. For example, a service provider may wish to provide a service to the clients 110-1 . . . 110-N utilizing the airport's AP 102 and primary network infrastructure rather than installing their own network infrastructure at the airport.

In an example, a cellular telecommunications data provider (e.g., Sprint, AT&T, Verizon, etc.) may wish to provide clients 110-1 . . . 110-N access to their respective computing networks, network devices, network services, etc. utilizing the AP 102. In such an example, zone 1 106-1 may include the primary zone. For example, zone 1 106-1 may include a portion of a computing network, network devices, network services, etc. assigned to and/or operated within the administrative domain controlled by the airport administration. For example, zone 1 106-1 may include a network device such as a controller within the administrative domain controlled by the airport administration. In such an example, zone 1 106-1 may correspond to the primary computing network (e.g., an airport Wifi) and/or the primary network controller (e.g., a network controller operated by and/or assigned to the airport IT department).

Continuing the airport example, zone 2 106-2 may include a first data zone corresponding to a first cellular telecommunications service provider leasing use of the AP 102 from the airport to provide service to clients 110-2. Zone 2 may include a portion of a computing network, network devices, network services, etc. assigned to and/or operated within the administrative domain controlled by and/or assigned to the first cellular telecommunications service provider. For example, zone 2 106-2 may include a network controller that is distinct, physically separate, and/or remotely located from the primary controller of zone 1 106-1. For example, zone 2 106-2 may include a controller that is physically located at or has direct access to a computing network, network resource, network service, etc. at a separate facility remote from the airport, such as a facility operated and/or controlled by the first telecommunications provider. For example, zone 2 106-2 may include a computing network and/or a network device of the computing network that is controlled by and/or configured by the first cellular telecommunications service provider. In an example, the controller of zone 2 106-2 may be in communication with segments of another computing network controlled by the first cellular telecommunications service provider, may utilize or enforce distinct security policies controlled and/or configured by the first cellular telecommunications service provider, may utilize authentication protocols and/or servers that are controlled and/or configured by the first cellular telecommunications service provider, etc. In some examples, by accessing the controller of zone 2 106-2, a client 110-2 may be able to access the first cellular telecommunications service provider computing network, computing network devices, computing network resources, computing network services, etc. that may be physically remote from the airport.

Zone N 106-N may include a second data zone corresponding to a second cellular telecommunications provider leasing use of the AP 102 from the airport to provide service to clients 110-N. Zone n 110-N may include a portion of a computing network, network devices, network services, etc. assigned to and/or operated within the administrative domain controlled by and/or assigned to the second cellular telecommunications service provider. The controller for zone N 106-N may include a network controller that is distinct, physically separate, and/or remotely located from the primary controller of zone 1 110-1 and the controller of zone 2 110-2. For example, zone N 106-N may include a controller that is physically located at or has direct access to a computing network, network resource, network service, etc. at a separate facility remote from the airport, such as a facility operated and/or controlled by the second telecommunications provider. For example, zone N 106-N may include a computing network and/or a network device of the computing network that is controlled by and/or configured by the second cellular telecommunications service provider. In an example, the controller of zone N 106-N may be in communication with segments of another computing network controlled by the second cellular telecommunications service provider, may utilize or enforce distinct security policies controlled and/or configured by the second cellular telecommunications service provider, may utilize authentication protocols and/or servers that are controlled and/or configured by the second cellular telecommunications service provider, etc. In some examples, by accessing the controller of zone N 106-N, a client 110-N may be able to access the second cellular telecommunications service provider computing network, computing network devices, computing network resources, computing network services, etc. that may be physically remote from the airport.

The AP 102 may connect to each data zone independently. Each data zone's network change or network failure may not affect the management of the AP 102 from other data zones. Each data zone may configure the AP 102 separately and the AP 102 may apply each configuration. However, if the primary zone fails, then all of the data zones may be affected including the data traffic on the data zone.

Each of the plurality of zones 106-1 . . . 106-N may be identified by its own corresponding SSID. For example, zone 1 106-1 and/or the service offered by zone-1 106-1 may be identified by a zone 1 SSID 108-1. Zone 2 106-2 and/or the service offered by zone 2 106-2 may be identified by a zone 2 SSID 108-2. Zone N 106-N and/or the service offered by zone N 106-N may be identified by a zone N SSID 108-N. The AP 102 may advertise and/or offer access to the zones 106-1 . . . 106-N identified by the SSIDs 108-1 . . . 108-N. For example, the radios 104-1 . . . 104-N may transmit radio signals advertising and/or providing access to the zones 106-1 . . . 106-N identified by the SSIDs 108-1 . . . 108-N.

A client 110-1 . . . 110-N may access a zone and/or a service provided by the zone through the AP 102 by associating with the desired SSID 108-1 . . . 108-N offered by the AP 102. For example, zone 1 client devices 110-1 may include computing devices that are subscribers, potential subscribers, users, clients, guests, etc. of the service provider controlling the underlying zone 106-1 of the zone 1 SSID 108-1. Likewise, zone 2 client devices 110-2 may include computing devices that are subscribers, potential subscribers, users, clients, guests, etc. of the service provider controlling the underlying zone 106-2 of the zone 1 SSID 108-2. Similarly, zone N client devices 110-N may include computing devices that are subscribers, potential subscribers, users, clients, guests, etc. of the service provider controlling the underlying zone 106-N of the zone N SSID 108-N. In an example, a client of a particular zone may have a prior relationship or credentials established with the service provider controlling the underlying zone of the SSID such that the client can be authenticated to the underling zone of the SSID. For example, zone 2 client devices 110-2 and zone N client devices 110-N may be customers with a cellular data and/or WiFi plane with the respective service provider controlling the zone that they are attempting to associate with. In an example, the first cellular telecommunications service provider may be the company that the zone 2 client devices 110-2 utilize as their cellular telecommunications service provider. Likewise, the second cellular telecommunications service provider may be the company that the zone 2 client devices 110-2 utilize as their cellular telecommunications service provider.

When a client device 110-1 . . . 110-N enters into physical proximity of the radio signals transmitted from the access point 102, the various SSIDs 108-1 . . . 108-N being advertised by the radios 104-1 . . . 104-N of the AP 102 may become visible to the client device 110-1 . . . 110-N. The client device 110-1 . . . 110-N may select an SSID 108-1 . . . 108-N, such as the SSID corresponding to the data zone of a service provider of which they are a customer, that the client device 110-1 . . . 110-N will associate with the AP 102 through.

Once the client devices 110-1 . . . 110-N has associated to the AP 102 under the selected SS ID 108-1 . . . 108-N, the AP 102 may manage the client devices 110-1 . . . 110-N under their respective SSIDs 108-1 . . . 108-N. As such, the AP 102 may provide service, such as access to the zones 106-1 . . . 106-N, for all the SS IDs 108-1 . . . 108-N with no communication between the managed client devices 110-1 . . . 110-N. Further, the AP 102 may facilitate the communication of client data traffic between the managed client devices 110-1 . . . 110-N and their corresponding zones 106-1 . . . 106-N without cross-contamination of the data traffic. For example, the client data traffic of a specific managed client device may be encrypted, and the data traffic may be tunneled directly between the specific managed client device, the AP 102, and/or the corresponding zone. That is, the AP 102 may build separate secure tunnels for each SS ID 108-1 . . . 108-N that terminate to a controller in the corresponding zone 106-1 . . . 106-N. Wireless frames from the client devices 110-1 . . . 110-N may be encrypted and/or decrypted for the corresponding SSID 108-1 . . . 108-N data zone in a secure zone. As such, secure data traffic communication, without cross-contamination between SSIDs, may be established between the various zones 106-1 . . . 106-N and the client devices 110-1 . . . 110-N utilizing the AP 102 of the primary computing network. In this manner, a plurality of virtual access points may be established on a single access point 102 chassis.

In contrast to an AP that utilizes both of its radios to advertise a plurality of SSIDs, examples of the present disclosure may assign SSIDs on a per-radio basis. For example, the AP 102 may assign a radio 104-1 of the access point 102 to a particular zone 106-1. Assigning the radio 104-1 of the access point 102 to a zone 106-1 may include assigning the radio 104-1 to send and/or receive data for the zone 106-1. For example, a radio 104-1 may be assigned to advertise and/or provide access to an SSID of a zone 106-1 to which it is assigned. The radio 104-1 may, in some examples, function as the radio for the particular zone to which it is assigned. That is, to revisit the example concept of partitioning the single AP 102 into a plurality of virtual APs via multi-zone operation of the AP 102, assigning a radio 104-1 to a zone 106-1 may include assigning the radio 104-1 as the data sending and/or receiving component of the virtual access point corresponding to the assigned zone 106-1 and/or SSID 108-1 utilizing the virtual access point. Where the AP 102 includes another radio 104-N, that radio 104-N may, in some examples, be assigned to another zone 106-2 and/or another SSID 108-2. That is, the other radio 106-2 may be assigned to be a data sending and/or receiving component of another virtual access point corresponding to the assigned zone 106-2 and/or SSID 108-2 utilizing the virtual access point.

However, examples described herein are not limited to a single zone to a single radio assignment structure. Instead, some examples may include a plurality of zones (e.g., 106-1 . . . 106-N) assigned to a single radio (e.g., 104-1). The plurality of zones may include one or more data zones and/or a primary zone assigned to the single radio. In examples where a plurality of zones and/or SSIDs are assigned to a single radio, the zones may take turns utilizing the radio resources of the shared radio. For example, the AP and/or the radio may utilize a time-sharing mechanism to partition radio time among the zones sharing the radio. In an example, each of radio of the plurality of radios of an AP may employ a distributed coordination function (DCF) technique employing a carrier-sense multiple access with collision avoidance (CSMA/CA) with a binary exponential back-off algorithm. For example, a radio may employ a back-off algorithm providing a time bounded access to the radio utilizing an asynchronous data transmission function to defer data transmissions from a zone utilizing the radio until another zone utilizing the radio has completed its transmission. As a result, sharing radio resources of a radio among a plurality of zones may result in deferral of data transmission between clients, the access point, and/or the corresponding zones during these periods of deferral. The greater the amount of zones assigned to a particular radio to greater the incidence of such a deferral may become. This delay may be experiences by the client device, access point, and/or corresponding zone as an adverse computing network condition such as lag, dropped packets, reduced throughput, errors, increased latency, increased jitter, out of order packet delivery, unavailable services, application crashed, etc.

However, examples of the present disclosure may be utilized to create prioritized data zones. For example, a data zone 106-2 may be assigned a dedicated or prioritized access to a radio 104-N of the access point 102, rendering the zone 106-2 a prioritized zone relative to non-prioritized zones (e.g., the zones 106-1 and/or 106-N that are sharing access to a radio 104-1 based on, for example, DCF back-off). In an example, a radio 104-N may be dedicated exclusively for utilization by a particular zone 106-2, thereby making zone 2 a prioritized data zone having unshared, dedicated, and/or exclusive use of the radio 104-N relative to other zones 106-1 and 106-N utilizing the AP. In other examples, a radio 104-N may be assigned to grant a client 110-2 of the prioritized data zone a prioritized access to the radio 104-N over a client 110-1 and 110-N of a non-prioritized data zone 106-1 and 106-N, such that the radio 104-N is immediately dedicated to uninterrupted data transmission for the prioritized zone 106-2, its corresponding clients 110-2, and/or the zone's SSID 108-2 whenever use of the radio 104-N is requested by the prioritized zone 106-2, its corresponding clients 110-2, and/or the zone's SSID 108-2.

As such, the environment 100 may be utilized to implement a subscription and/or license-based prioritization system. For example, a tenant such as a service provider corresponding to a data zine utilizing a multi-zone AP 102 may purchase a particular subscription and/or license level that enables the treatment of that zone as a prioritized data zone relative to other data zones or primary zones that have purchased a different subscription or license level. In some examples, assignments of radios 104-1 . . . 104-N to various zones 106-1 . . . 106-N may be performed based on an indication of a subscription level and/or license level purchased or otherwise enrolled in by each of the AP tenant operating each one of the various zones 106-1 . . . 106-N.

Figure 2:
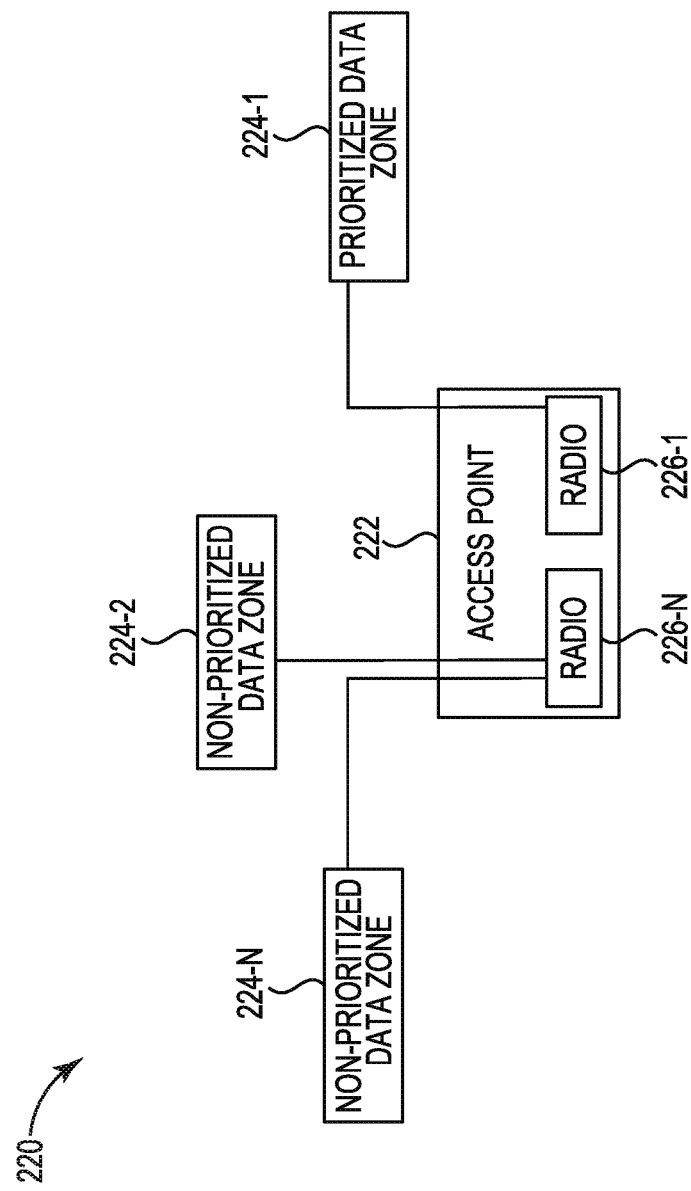
FIG. 2 illustrates a system for prioritized radio assignments consistent with the disclosure.

FIG. 2 illustrates an example of a system 220 for prioritized radio assignments consistent with the disclosure. The system 220 is not limited to a particular example described herein and may include additional components and/or functionalities such as those described with regard to the environment 100 of FIG. 1, the computing device 330 of FIG. 3, the non-transitory machine-readable medium 440 of FIG. 4, and the method 550 of FIG. 5.

The system 220 may include an AP 222. The AP 222 may include a plurality of radios 226-1 . . . 226-N. The AP 222 may utilize the plurality of radios 226-1 . . . 226-N to send and receive radio signals communicating data between a computing network and clients. Each radio of the plurality of radios 226-1 . . . 226-N may be operable in a same frequency band. For example, the plurality of radios 226-1 . . . 226-N may be a plurality of 5 GHz WiFi radios operable in the 5 GHz frequency band. However, each of the plurality of radios 226-1 . . . 226-N may be operable in a distinct and/or non-overlapping range of radio frequencies within the 5 GHz radio frequency band.

The AP 222 may be configured to provide multi-zone operation. The multi-zone operation may include virtually partitioning the operation of the AP 222 into a plurality of virtual access points assigned to each of a plurality of zones. The zones may include a primary zone and/or a data zone. Each of the plurality of zones may correspond to a distinct tenant renting utilization of the AP 222 to provide a service in the location of the primary computing network to which the AP 222 is connected.

The system 220 may include a prioritized data zone 224-1. A prioritized data zone 224-1 may include a data zone indicated as having a particular subscription level and/or a particular license level. That is, in some examples, a tenant controlling a data zone may purchase the rights to become the prioritized data zone or one of the prioritized data zones for an AP 222.

The system 220 may include a network device. The network device may be a computing device comprising instructions executable by the processing resource to perform various functions corresponding to prioritized radio assignments. In some examples, the network device may be the AP 222. In some examples, the network device may include a network controller.

The system 220 may be utilized to assign a first radio 226-1 of the AP 222. The first radio 226-1 of the AP 222 may be assigned to a prioritized data zone 224-1. Assigning the first radio 226-1 of the AP 222 to the prioritized data zone 224-1 may include assigning the first radio 226-1 to be utilized exclusively by the prioritized data zone 224-1. That is, the first radio 226-1 of the AP 222 may be utilized exclusively to transmit an extended service set identifier (ESSID) and/or maintain data communication between the prioritized data zone 224-1 and the corresponding client devices associated with the ESSID at the AP 222. Additionally, assigning the first radio 226-1 of the AP 222 to the prioritized data zone 224-1 may include granting the prioritized data zone 224-1, the ESSID corresponding to the prioritized data zone 224-1, and/or the clients of the prioritized data zone 224-1/ESSID a prioritized access to the radio resources of the first radio 226-1 over other non-prioritized data zones that may utilize the first radio 226-1. For example, data traffic on another ESSID, corresponding to non-prioritized data zones, that is utilizing the first radio 226-1 may be discontinued and/or delayed while the prioritized data zone 224-1, the ESSID corresponding to the prioritized data zone 224-1, and/or the clients of the prioritized data zone 224-1/ESSID request use of the first radio 226-1.

The system 220 may be utilized to assign a second radio 226-N of the AP 222. As described above, the second radio 226-N may be operable in the same frequency band as the first radio 226-1. For example, the first radio 226-1 may be operable within a first range of radio frequencies within a first range of radio frequencies within the 5 GHz radio frequency band while the second radio 226-N is operable within a second range of radio frequencies within the 5 GHz radio frequency band that is non-overlapping with the first range.

Assigning the second radio 226-N of the AP 222 may include assigning the second radio 226-N of the AP 222 to a plurality of non-prioritized data zones 224-2 . . . 224-N. Assigning the second radio 226-N of the AP 222 to a plurality of non-prioritized data zones 224-2 . . . 224-N may include assigning the second radio 226-N to be utilized in a shared manner between the plurality of non-prioritized data zones 224-2 . . . 224-N. That is, the second radio 226-N of the AP 222 may be utilized to alternate between transmitting an extended service set identifier (ESSID) and/or maintain data communication between each data zone of the plurality of non-prioritized data zones 224-2 . . . 224-N and their respective client devices associated with the corresponding ESSID at the AP 222.

For example, each of the plurality of non-prioritized data zones 224-2 . . . 224-N may compete for access to the radio resources of their assigned second radio 226-N. For example, each of the plurality of non-prioritized data zones 224-2 . . . 224-N may compete for access to the radio resources of their assigned second radio 226-N utilizing a distributed coordination function (DCF) employing a back-off algorithm to distribute control of the second radio 226-N between the plurality of non-prioritized data zones 224-2 . . . 224-N.

As described above with respect to multi-zone operation of the AP 222, the primary zone may be controlled by a primary controller, the prioritized data zone 224-1 may be controlled by a prioritized data zone controller, and each data done of the plurality of non-prioritized data zones 224-2 . . . 224-N may be controlled by a non-prioritized data zone controller. That is, each of the zones may be controlled by a separate controller controlled by a separate administrative domain. For example, each of the zones may be controlled by a separate controller in communication with segments of another computing network controlled by a separate tenant of the AP 222, may utilize or enforce distinct security policies controlled and/or configured by a separate tenant of the AP 222, may utilize authentication protocols and/or servers that are controlled and/or configured by a separate tenant of the AP 222, etc. Each of the zones and/or each of the controllers of the data zones may be located in physically distinct locations remote from the primary zone.

In some examples, data traffic communicated across the first radio 226-1 may be transmitted in a first tunnel terminating at the prioritized data zone controller. In contrast, data traffic communicated across the second radio 226-N may be transmitted in separate tunnels to their respective non-prioritized data zone controllers. For example, if a client is associated to the AP 222 through an ESSID corresponding to a first non-prioritized data zone 224-2, then the data transmitted from the client may be transmitted in a second tunnel, separate from the first tunnel, terminating to a non-prioritized data zone controller of the non-prioritized data zone 224-2. Similarly, if a client is associated to the AP 222 through an ESSID corresponding to a second non-prioritized data zone 224-N, then the data transmitted from the client may be transmitted in a third tunnel, separate from the first and second tunnel, terminating to a non-prioritized data zone controller of the non-prioritized data zone 224-N.

Figure 3:
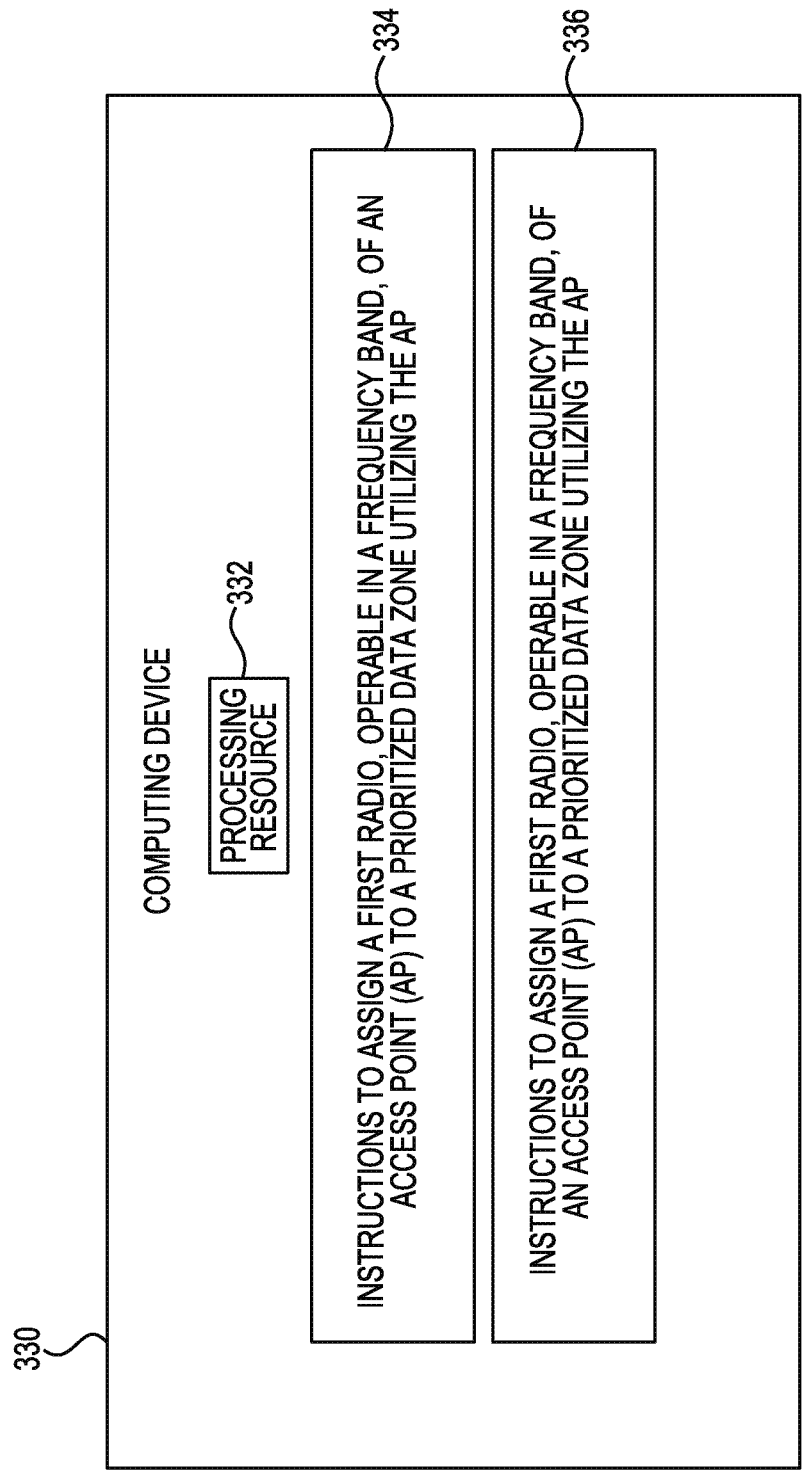
FIG. 3 illustrates a computing device for prioritized radio assignments consistent with the disclosure.

FIG. 3 illustrates a computing device 330 for prioritized radio assignments consistent with the disclosure. The computing device 330 is not limited to a particular example described herein and may include additional components and/or functionalities such as those described with regard to the environment 100 of FIG. 1, the system 220 of FIG. 2, the non-transitory machine-readable medium 440 of FIG. 4, and the method 550 of FIG. 5.

The computing device 330 may include a network device connected to and/or providing access to and/or data communication with a computing network. For example, the computing device 330 may include an access point. The computing device 330 may include a controller. The computing device 330 may include a single controller, a cluster of controllers, distributed controllers, and/or a master controller. The computing device 330 may be located on a primary computing network or may be located on a network associated with a data zone and be remote from the primary network. The computing device 330 may be utilized in creating and/or controlling a wireless local area network in an environment such as a home, office building, vehicle, outdoor space, etc. The computing device 330 may be connected to a wired router, switch, or hub via a cabled (e.g., Ethernet cable) connection, a controller, an access point, etc. The computing device 330 may project signals such as WiFi, BLE, Bluetooth, ZigBee, etc. signals.

The computing device 330 may include a processing resource 332. The computing device may include and/or have access to a memory resource. For example, the computing device 330 may include a non-transitory machine-readable medium storing instructions executable by the processing resource to perform functions corresponding to prioritized radio assignments.

For example, the computing device 330 may assign a first radio, operable in a frequency band, of an AP. The computing device 330 may assign the first radio to a prioritized data zone that is in communication with the AP and/or utilizing the AP to offer clients of a primary zone access to the prioritized data zone and/or a service thereof. For example, a first cellular data communications provider may pay an airport authority to be considered a prioritized data zone with respect to the airports primary computing network. Based on an electronic indication that the cellular data communications provider has enrolled in a subscription or license granting them a classification as a prioritized data zone, the computing device 330 may assign the prioritized data zone a prioritized and/or exclusive access to the first radio of an access point such that the data traffic associated with an ESSID of the cellular data communication provider does not compete with other data traffic for the radio resources of the first radio.

The computing device 330 may assign a second radio, operable in a different portion of the same frequency band as the first radio, of the AP. The computing device 330 may assign the second radio of the AP to be shared among a plurality of non-prioritized data zones that are in communication with the AP and/or utilizing the AP to offer their corresponding clients access to the corresponding non-prioritized data zone and/or a service thereof. For example, a second cellular data communications provider and a third cellular data communications provider may pay an airport authority less than the first cellular data communications provider in order to utilize the same AP on the primary network as the first cellular data communications provider. However, the lesser payment may result in the second and third providers being considered non-prioritized data zones with respect to the airports primary computing network.

Based on an electronic indication that the second and third cellular data communications providers have enrolled in a subscription or license granting them a classification as a non-prioritized data zone, the computing device 330 may assign the non-prioritized data zone shared access to the second radio of the access point such that the data traffic associated with an ESSID of the second cellular data communication provider may compete with data traffic of the third cellular data communications provider for the radio resources of the second radio.

The second radio may utilize a DCF employing a back-off algorithm to distribute control of the second radio between the plurality of non-prioritized data zones. As a result of sharing access to the second radio, the clients, data zones, and/or data traffic of the competing data zones may suffer delays and/or other adverse network conditions relative to the clients of the prioritized data zone, the prioritized data zone, and/or data traffic of the prioritized data zone.

Figure 4:
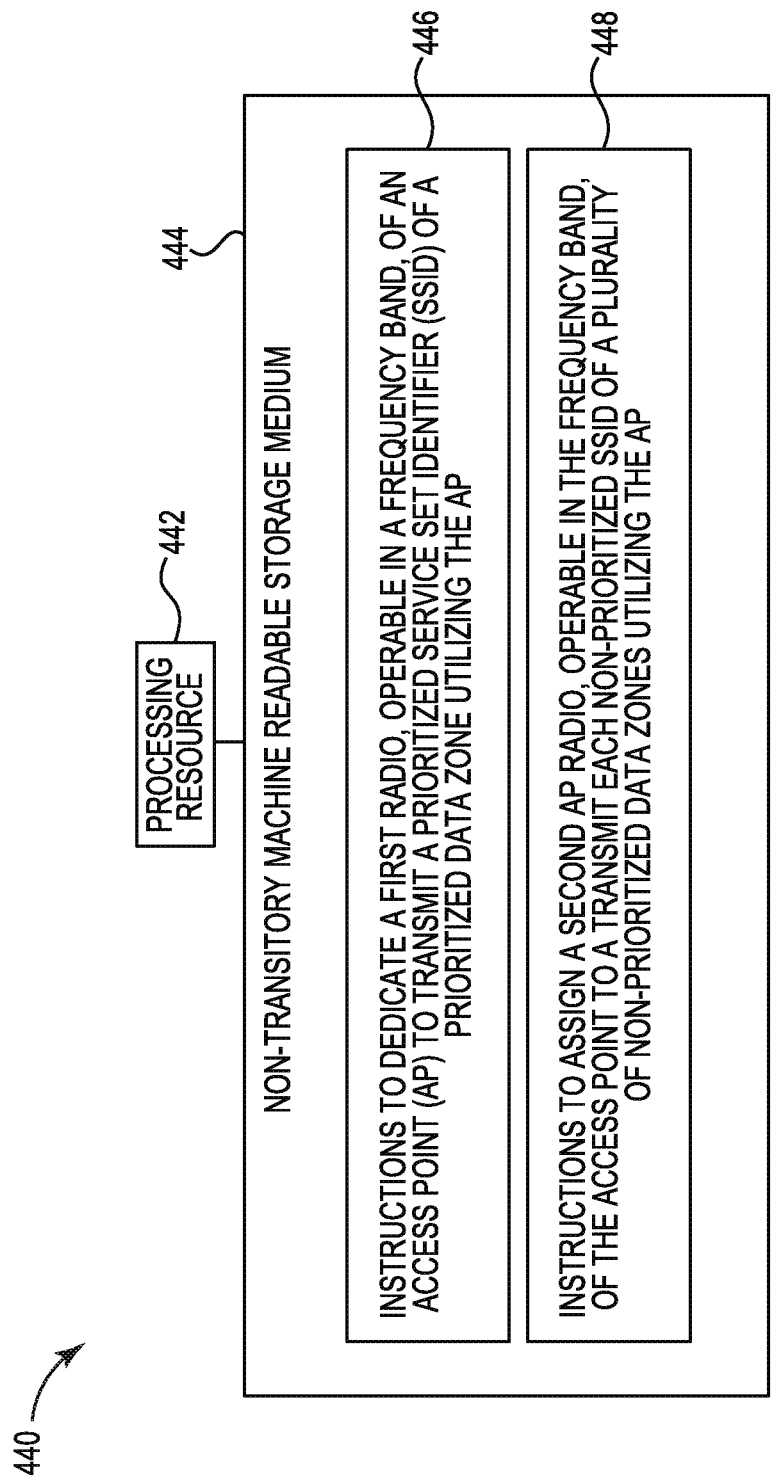
FIG. 4 illustrates a diagram of a processing resource and a non-transitory machine-readable medium for prioritized radio assignments consistent with the disclosure.

FIG. 4 illustrates a diagram 440 of a processing resource 442 and a non-transitory machine-readable medium 444 for prioritized radio assignments consistent with the disclosure. A memory resource, such as the non-transitory machine-readable medium 444, may be used to store instructions (e.g., 446, 448, etc.) executed by the processing resource 442 to perform the operations as described herein. The operations are not limited to a particular example described herein and may include additional operations such as those described with regard to the environment 100 of FIG. 1, the system 220 of FIG. 2, the computing device 330 of FIG. 3, and the method 550 described in FIG. 5.

A processing resource 442 may execute the instructions stored on the non-transitory machine-readable medium 444. The non-transitory machine-readable medium 444 may be any type of volatile or non-volatile memory or storage, such as random-access memory (RAM), flash memory, read-only memory (ROM), storage volumes, a hard disk, or a combination thereof.

The machine-readable medium 444 may store instructions 446 executable by the processing resource 442 to dedicate a first radio, operable in a frequency band, of an access point to a prioritized data zone. For example, the first radio may be dedicated to transmission of a prioritized SSID of a prioritized data zone that is utilizing the AP to provide access to its SSID.

In some examples, the first radio may be dedicated to the transmission of the prioritized SS ID of a prioritized data zone responsive to an indication that the prioritized data zone corresponds to a particular subscription level and/or a particular license level. For example, a tenant in control of the administrative domain of the prioritized data zone may make a payment and/or otherwise enroll in a subscription or license to be classified as the prioritized data zone for a primary network. In response to the payment being received and/or the enrollment being processed, an electronic indication of the prioritized data zone as corresponding to the subscription level and/or license level may be generated triggering the dedication of the first radio to the transmission of the SSID of the prioritized data zone.

Dedicating the first radio to the transmission of the prioritized SSID of the prioritized data zone may include dedicating use of the first radio exclusively to transmission of encrypted data between clients authenticated to the prioritized data zone and the prioritized data zone controller of the prioritized data zone. That is, data traffic may be received to the SSID through the dedicated first radio and tunneled to a controller of the prioritized data zone. Data traffic from other, non-prioritized, data zones may be excluded from utilizing the first radio and data traffic of the prioritized data zone may not be cross contaminated with data traffic of the non-prioritized data zone by virtue of this separation. Further, since the prioritized data zone has access to the radio resources of the first radio to the exclusion of the non-prioritized data zones, the prioritized data zone will experience fewer delays and/or adverse network conditions that may occur when sharing access to a radio with other data zones.

The machine-readable medium 444 may store instructions 448 executable by the processing resource 442 to assign a second AP radio, operable in the frequency band, of the access point to a transmit each non-prioritized SS ID of a plurality of non-prioritized data zones utilizing the AP. Although the second AP radio may be operable in the same frequency band as the first radio, the two radios may operation in different, non-overlapping, portions of the same frequency band. In addition, band-pass filters may be utilized with the radios to mitigate peripheral interference caused by operation of the two radios in adjacent non-overlapping portions of the same frequency band.

Utilizing the first and second radio in different, non-overlapping, portions of the same frequency band the prioritized SSID to be transmitted by the first radio and a second SSID of a non-prioritized data zone of the plurality of non-prioritized data zones to be transmitted by the second radio may be transmitted simultaneously by the access point. However, each of the plurality of non-prioritized data zones may compete with the other non-prioritized data zones of the plurality of non-prioritized data zones in order to utilize the second radio to transmit their corresponding SSID. The second radio may utilize a DCF employing a back-off algorithm to distribute control of the second radio between the plurality of non-prioritized data zones.

FIG. 5 illustrates a diagram of a method 550 for prioritized radio assignments consistent with the disclosure. The method 550 is not limited to a particular example described herein and may include additional components and/or functionalities such as those described with regard to the environment 100 of FIG. 1, the system 220 of FIG. 2, the computing device 330 of FIG. 3, and the non-transitory machine-readable medium 440 of FIG. 4.

At 552, the method 550 may include assigning access to a first radio operable in a frequency band, of an AP. For example, access to a first radio may be assigned to a prioritized service provider to provide a prioritized service utilizing the AP. In some examples, assigning the access to the first radio may be based on an indication that the prioritized service provider has enrolled in a first subscription level and/or that the non-prioritized service providers have enrolled in a second subscription level.

At 554, the method 550 may include assigning shared access to a second radio, operable in the frequency band, of the AP to a plurality of non-prioritized service providers to provide corresponding non-prioritized services utilizing the AP. For example, a plurality of non-prioritized service providers may share the second radio to provide clients access to their respective services. Sharing the second radio may include utilizing a DCF employing a back-off algorithm to distribute control of the second radio between the plurality of non-prioritized service providers.

At 556, the method 550 may include dedicating the first radio to communication of a prioritized service set identifier (SSID) corresponding to access to the prioritized service. For example, the prioritized SSID may include an SSID of a data zone controlled by the prioritized service provider. Therefore, assigning access to the first radio to the prioritized service provider may include dedicating the first radio to data communication between the clients of the prioritized SSID and/or the prioritized data zone controlled by the service provider.

At 558, the method 550 may include utilizing the second radio to alternately communicate each non-prioritized SS ID corresponding to access to the non-prioritized services. For example, a non-prioritized SSID may include an SSID of a non-prioritized data zone controlled by a non-prioritized service provider. Therefore, assigning access to the second radio to a plurality of non-prioritized service providers may include assigning the second radio to be shared among the plurality of non-prioritized service providers. As such, each non-prioritized data zone may be forced to wait for its opportunity to communicate its particular non-prioritized SSID over the second radio until another one of the non-prioritized data zones concludes it data communication over the second radio.

The method 550 may include authenticating, with the prioritized service provider, a first client requesting access to the prioritized SSID. In some examples, authenticating the first client to the prioritized SS ID may include authenticating the first client with a first authentication server specific to the administrative domain of the prioritized data zone.

The method 550 may include authenticating, with a first non-prioritized service provider, a second client requesting access to a non-prioritized SSID corresponding to the first non-prioritized service provider. In some examples, authenticating the second client with the first non-prioritized service provider may include authenticating the second client with a second authentication server, separate from the first authentication server, specific to the administrative domain of the first non-prioritized data zone.

The method 550 may include authenticating, with a second non-prioritized service provider, a third client requesting access to a non-prioritized SSID corresponding to the second non-prioritized service provider. In some examples, authenticating the third client with the second non-prioritized service provider may include authenticating the third client with a third authentication server, separate from the first and second authentication servers, specific to the administrative domain of the second non-prioritized data zone.

The method 550 may include transmitting data traffic from the first client to a prioritized controller corresponding to the prioritized service provider. The prioritized controller corresponding to the prioritized service provider may be a controller that is specific to the administrative domain of the prioritized service provider.

The method 550 may include transmitting data traffic from the second client to a first non-prioritized controller corresponding to the first non-prioritized service provider. The first non-prioritized controller corresponding to the first non-prioritized service provider may be a controller that is specific to the administrative domain of the first non-prioritized service provider. The first non-prioritized controller may be separate from the prioritized controller.

The method 550 may include transmitting data traffic from the third client to a second non-prioritized controller corresponding to the second non-prioritized service provider. The second non-prioritized controller corresponding to the second non-prioritized service provider may be a controller that is specific to the administrative domain of the second non-prioritized service provider. The second non-prioritized controller may be separate from the prioritized controller and the first non-prioritized controller.

Utilizing the second radio to alternately communicate each non-prioritized SSID corresponding to access to the non-prioritized services may result in a delay of transmission over an SSID corresponding to a particular non-prioritized data zone when another SSID corresponding to a different particular non-prioritized data zone is utilizing the radio for its data communication. For example, the method 550 may include delaying the transmitting of the data traffic from the second client via the second SSID when the data traffic from the third client is being transmitted utilizing the third SSID.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure and should not be taken in a limiting sense.

What is claimed:

1. A system, comprising:
   a processing resource;
   a computing device comprising instructions executable by the processing resource to:
   assign a first radio, operable in a frequency band, of an access point (AP) to a prioritized data zone utilizing the AP, wherein the prioritized data zone is accessible to clients that have purchased a first subscription, wherein the first radio is operable within a first range of radio frequencies within a 5 GHz radio frequency band; and
   assign a second radio, operable in the frequency band, of the AP to a plurality of non-prioritized data zones utilizing the AP, wherein the second radio is accessible to clients that have purchased a second subscription or a third subscription, wherein the second subscription and the third subscription are different, wherein the second radio is operable within a second range of radio frequencies within the 5 GHz radio frequency band, wherein the first range and the second range are non-overlapping.

2. The system of claim 1, wherein the instructions executable by the processing resource to assign the first radio to the prioritized data zone include instructions executable by the processing resource to assign the first radio to be utilized exclusively by the prioritized data zone.

3. The system of claim 1, wherein the instructions executable by the processing resource to assign the first radio to the prioritized data zone include instructions executable by the processing resource to grant a client of the prioritized data zone a prioritized access to the first radio over a client of a non-prioritized data zone of the plurality of non-prioritized data zones.

4. The system of claim 1, wherein the instructions executable by the processing resource to assign the first radio to the prioritized data zone include instructions executable by the processing resource to dedicate the first radio to transmit an extended service set identifier (ESSID) of the prioritized data zone.

5. The system of claim 1, wherein the instructions executable by the processing resource to assign the second radio to the prioritized data zone include instructions executable by the processing resource to utilize the second radio to transmit an extended service set identifier (ESSID) of each non-prioritized data zone of the plurality of non-prioritized data zones.

6. The system of claim 1, wherein the prioritized data zone is controlled by a prioritized data zone controller and wherein each non-prioritized data zone of the plurality of non-prioritized data zones is controlled by a corresponding non-prioritized data zone controller.

7. The system of claim 1, wherein data traffic communicated across the first radio is transmitted in a tunnel terminating at the prioritized data zone controller, and wherein data traffic communicated across the second radio is transmitted in a tunnel to a non-prioritized data zone controller corresponding to the non-prioritized data zone of the plurality of non-prioritized data zones being utilized by a transmitting client device.

* * * * *